United States Patent [19]

Mischke et al.

[11] Patent Number: 5,508,389

[45] Date of Patent: Apr. 16, 1996

[54] PROCESS FOR PRODUCING CONCENTRATED AQUEOUS SOLUTIONS OF ANIONIC AZO DYES

[75] Inventors: Peter Mischke, Bad Soden am Taunus; Kurt Hohmann, Neu-Isenburg; Eckhard Schwab, Frankfurt am Main; Manfred Sittig, Kriftel, all of Germany

[73] Assignee: Hoechst Aktiengesellschaft, Frankfurt, Germany

[21] Appl. No.: 30,280

[22] PCT Filed: Sep. 25, 1991

[86] PCT No.: PCT/EP91/01830

§ 371 Date: Mar. 26, 1993

§ 102(e) Date: Mar. 26, 1993

[87] PCT Pub. No.: WO92/06140

PCT Pub. Date: Apr. 16, 1992

[30] Foreign Application Priority Data

Sep. 27, 1990 [DE] Germany ............... 40 30 580.5

[51] Int. Cl.$^6$ ............... C09B 41/00; C09B 67/26; D06P 1/384

[52] U.S. Cl. ............... 534/581; 8/527; 534/637; 534/642; 534/887

[58] Field of Search ............... 534/581; 8/527

[56] References Cited

U.S. PATENT DOCUMENTS

| 2,812,321 | 11/1957 | Eberhart et al. | 534/581 |
| 3,444,157 | 5/1969 | Tanaka et al. | 534/581 |
| 4,082,742 | 4/1978 | Eastlack | 534/581 |
| 4,110,073 | 8/1978 | Mollet et al. | 8/527 |
| 4,118,384 | 10/1978 | Molls et al. | 534/581 |
| 4,589,885 | 5/1986 | Opitz | 8/527 |

FOREIGN PATENT DOCUMENTS

| 143406 | 11/1984 | European Pat. Off. |
| 3046450 | 8/1981 | Germany. |
| 3641677 | 6/1988 | Germany. |

OTHER PUBLICATIONS

Havlik et al *Chemical Abstracts, 108:77125a (1988)*.
Modrow et al *Chemical Abstracts, 107:79478w (1987)*.

*Primary Examiner*—Johann Richter
*Assistant Examiner*—Fiona T. Powers
*Attorney, Agent, or Firm*—Connolly & Hutz

[57] ABSTRACT

If highly concentrated aqueous solutions of azo dyes are prepared directly by diazotization and coupling reactions, appreciable difficulties generally result as a consequence of the fact that the diazotization and coupling reactions give rise to viscous phases which lead to stirring problems in the reaction apparatus used, which in turn results in an incomplete synthesis. The novel process for preparing concentrated aqueous dye solutions of an anionic dye in an aqueous medium overcomes this disadvantage by carrying out the diazotization of the aromatic amine diazo component and/or the coupling reaction between the diazonium salt and the coupling component in the presence of an auxiliary which exerts a viscosity-reducing effect on pasty phases. Examples of such auxiliaries are optionally alkyl-substituted naphthalenesulfonic acid-formaldehyde condensation products, ligninsulfonates, polyacrylates and copolymers of maleic anhydride and methacrylic acid or acrylic acid.

8 Claims, No Drawings

PROCESS FOR PRODUCING CONCENTRATED AQUEOUS SOLUTIONS OF ANIONIC AZO DYES

The present invention relates to water-soluble azo dyes. The use of liquid dye preparations instead of powders has become more and more important in recent years, since liquid dye preparations offer some significant advantages over the traditional powder forms, such as no dusting when making up padding or dyeing liquors or print pastes, easy meterability and no clumping due to inadequate wetting, but also thorough and efficient dispersion in the application medium with the attendant satisfactory dyeing results. In addition to meeting the many requirements which liquid dye preparations have to meet, for example the long storage life over a wide temperature range, even at temperatures below freezing, ready miscibility with water and other liquid dye preparations, such liquid dye preparations should have very high dye concentrations to reduce transport and packaging costs. The preparation of these highly concentrated dye solutions should be possible entirely reproducibly without major technical effort.

However, the preparation of highly concentrated aqueous solutions of azo dyes by direct means is difficult or even impossible because the diazotization and coupling reactions give rise to very viscous phases which, in the apparatus customarily used for dye synthesis, lead to serious stirring problems or make stirring completely impossible. As a consequence, the dye syntheses are distinctly slowed or remain incomplete, the formation of polluting by-products increases, or, because of the appearance of pasty reaction mixtures, the dye syntheses come to a stop entirely.

In practice, therefore, the diazotization and coupling reactions are carried out in dilute aqueous solutions, and the dye content is concentrated only afterwards by partial dewatering, for example with the aid of thin film evaporators or by membrane separation techniques. A further possibility of obtaining more concentrated solutions after synthesis is to separate off the as synthesized dyes in suitable precipitation reactions, for example by precipitating anionic dyes in a more acid region and separating them off by filtration and by subsequent renewed dissolving of the resulting dyes in water by means of an alkaline agent to obtain more highly concentrated weakly acid to neutral dye solutions.

However, such post dye synthesis operations are costly on account of the additional frequently appreciably high apparatus requirements, distinctly increased energy requirements and increased personnel and time requirements and, owing to the possible production of large quantities of salt- and dye-containing permeates or mother liquors, are highly polluting of the environment.

Another method of avoiding, if possible, the appearance of pasty states in the diazotization batch of 1-amino-2-naphthol-4-sulfonate acid is known from U.S. Pat. No. 2,812,321, according to which polyoxyethylene fatty acid esters are added to the batch. However, the viscosity-reducing effect of these polyethoxylated fatty acids is still insufficient.

It has now been found with the present invention that, surprisingly, the diazotization and coupling reactions can be carried out in highly concentrated solutions of these starting components and that in this way it is possible to prepare highly concentrated aqueous solutions of anionic azo dyes, preferably those which possess a fiber-reactive group, or a mixture of a highly concentrated dye solution with a suspension of the dye in a technically simple, inexpensive, highly reproducible and, in particular, environmentally safe manner by carrying out the diazotization and/or coupling reaction in aqueous medium in the presence of an auxiliary which has a viscosity-reducing effect on the pasty phases which appear at high concentrations. These measures prevent the appearance of pasty reaction mixtures having the above-mentioned serious disadvantages, and the diazotization and coupling reactions can be carried out rapidly and substantially completely without formation of environmentally polluting by-products.

The present invention accordingly provides in particular a process for preparing concentrated aqueous dye solutions of anionic dyes having a dye content of preferably 15 to 40% by weight, in particular from 15 to 35% by weight, especially between 20 and 30% by weight, which comprises carrying out the diazotization of the aromatic amine serving as the diazo component and/or the reaction of the diazonium compound of the aromatic amine with the coupling component in an aqueous medium at a total concentration of diazonium and coupling compound of at least 10% by weight, preferably from 15 to 40% by weight, in particular preferably from 15 to 35% by weight, and especially from 20 to 30% by weight, based on the aqueous synthesis solution, in the presence of an auxiliary which exerts a viscosity-reducing effect on pasty phases.

It is true that German Offenlegungsschrift 2,847,532 already discloses a process for preparing azo dyes by coupling diazo compounds on coupling components where the coupling is carried out in the presence of a reaction product of formaldehyde and an aromatic sulfonic acid or a salt thereof, said to act as a coupling accelerant. However, this process does not solve the problem of synthesizing highly concentrated aqueous solutions of azo dyes. On the contrary, the concentrations chosen there for the starting compounds are so low that viscous reaction solutions cannot arise in the first place. Nor is such teaching provided in German Offenlegungsschrift 2,607,122, which discloses the preparation of azo dyes by diazotizing and coupling in the presence of anionic dispersants. In this process the anionic dispersants are used in the form of their acids in order to replace the inorganic acid necessary for the diazotization with the intention of obtaining salt-free dye preparations. The large quantities of dispersant acids required for this purpose and the attendant high organic levels in the dyehouse effluents are a disadvantage from the ecological point of view.

Nor does German Offenlegungsschrift 2,313,003 provide any indication for finding the process of the present invention. Said Offenlegungsschrift describes a process for preparing dispersible solid preparations of water-insoluble disperse dyes wherein the coupling reaction is carried out in the presence of anionic dispersants; the azo dyes are obtained in the form of dispersions. The dispersant added at the start of the dye synthesis merely serves to aid dispersal of the dye powder product in water when dyeing dispersions come to be prepared.

The diazotization and coupling reactions are carried out in the process of the present invention similarly to the known processing methods and conditions, for instance the diazotization reaction of the aromatic amine serving as diazo component by means of nitrous acid (such as nitrosyl sulfuric acid or by means of sodium nitrite and an aqueous acid, for example filtration-removable acid ion exchangers having sulfo and/or carboxyl groups as acid donors, sulfuric acid or lower aliphatic carboxylic acids, preferably hydrochloric acid) at a temperature between −5° C. and +20° C. and at a pH below 2, and the coupling reaction likewise in an aqueous medium at a temperature of between 5 and 30° C. and, if it is an amino-containing coupling component, at a pH between 0.5 and 4 and if it is a hydroxyl-containing coupling component at a pH between 2 and 7.5. The process of the present invention is especially advantageous in the case of diazotization reactions and/or acid coupling reactions.

The viscosity-reducing auxiliary used according to the present invention, or a mixture of such auxiliaries, is used in the diazotization and coupling reactions in a total amount of from 0.01 to 10% by weight, preferably between 0.05 and 5% by weight, based on the weight of the azo dye to be prepared. The auxiliaries used according to the invention can be added to the synthesis solutions before or during the diazotization reaction or, if only the coupling reaction is to be carried out with their aid, after the diazotization reaction to the diazonium salt solution or suspension formed or only in the course of the preparation of the coupling mixture or to the coupling component itself or during the coupling reaction. The choice of an auxiliary or auxiliary mixture which is most effective for the diazotization and/or coupling reaction, and the minimum quantities required thereof, can each be determined in simple preliminary experiments.

Viscosity-reducing auxiliaries which are usable according to the present invention are for example ligninsulfonates, polycarboxylates, such as polyacrylates and copolymers of maleic anhydride and methyl vinyl ether or methacrylic acid, maleic acid and acrylic acid, copolymers of unsaturated sulfonic acids, such as allyl-sulfonic acid or acrylamidomethylpropanesulfonic acid, with acrylic acid, condensation products or phenols, such as cresoles, with formaldehyde and alkali metal sulfites, condensation products of naphthalenesulfonic acids or of monoalkyl- and dialkyl-naphthalenesulfonic acids with formaldehyde, each with a degree of sulfonation of from 80 to 200%, preferably from 80 to 150%, and an average molecular weight of from 350 to 35,000, of oxyditolylsulfonic acids and formaldehyde and of oxydiphenylsulfonic acids and formaldehyde, of terphenylsulfonic acids and formaldehyde and also cocondensation products of the aforementioned aromatic sulfonic acids with formaldehyde. Compounds of the above kind are described for example in German Offenlegungsschriften Nos. 2,635,820, 2,820,717 and 3,111,488 and European Patent Application Publication No. 0 014 326 A. Further auxiliaries according to the invention are for example sulfosuccinic acid derivatives of ethoxylated nonylphenolformaldehyde condensation products and the sulfosuccinic monoesters described in German Patent 2,132,403.

The auxiliaries usable according to the present invention can be used in the form of their acids or as water-soluble salts, such as in particular alkali metal salts, for example potassium and in particular sodium salts, and similarly individually or in twos or higher multiples, as in a mixture.

The present invention accordingly also provides for the use of such auxiliaries for preventing highly viscous states in the reaction batch during the preparation of azo dyes by diazotization and coupling.

The process of the present invention provides a simple and inexpensive means of arriving directly, not only for a single batch but also continuously, at concentrated aqueous solutions of azo dyes. These aqueous solutions obtained can be used as-synthesized directly as commercial material in a conventional manner for preparing dyebaths, dyeing liquors and print pastes. If necessary, they are admixed with customary auxiliaries and/or adjusted to a certain pH range as per known measures for improving the stability, in particular the storage stability. Such auxiliaries are for example buffer substances which, in particular in the case of fiber-reactive dyes, are capable of maintaining a pH between 4 and 7, for example alkali metal borates, alkali metal acetates and mixtures of primary and secondary alkali metal phosphates, or else solubility-increasing compounds, such as ε-caprolactam, tetramethylurea, tetramethylene sulfone and dimethylformamide, also urea, thiourea, pyridine and formamide; these compounds may also be added even during the coupling reaction. Further customary auxiliaries which can be added to the dye solutions prepared according to the present invention are for example antifreezes, antifoams, surfactants and antimicrobials.

The azo dyes preparable according to the present invention are mono- and disazo dyes or trisazo dyes; they may contain fiber-reactive groups and, after synthesis, be converted into metal complex derivatives such as their 1:1 copper, 1:2 chromium and 1:2 cobalt complexes. Fiber-reactive groups are for example those of the vinylsulfonyl and vinylsulfonylamide series, of the halogen-substituted s-triazinylamino and halogen-substituted pyrimidylamino series, and of the series of the unsubstituted or halogen-substituted aliphatic carboxamides, such as the chloroacetylamide, the acryloylamide, the β-bromopropionylamide or the α,β-dibromopropionylamide radical. These fiber-reactive groups can be bonded to the actual dye radical not only via an amino grouping but also via an aliphatic, aromatic or araliphatic bridge member or via a carboxamido- or sulfonamido-attached alkylene radical as bridge member. Such fiber-reactive groupings are known in large numbers from the literature, for example from German Offenlegungsschriften Nos. 2,201,280 and 2,927,102, German Auslegeschriften Nos. 1,265,698 and 2,614,550 and European Patent Application Publication Nos. 0 040 806, 040 790, 070 807, 0 141 367, 0 144 766, 0 361 440, 0 374 758 and 0 377 166 and also the references cited therein.

Fiber-reactive groups per se are for example groups conforming to the formulae (1a), (1b), (2a), (2b), (2c) and (3)

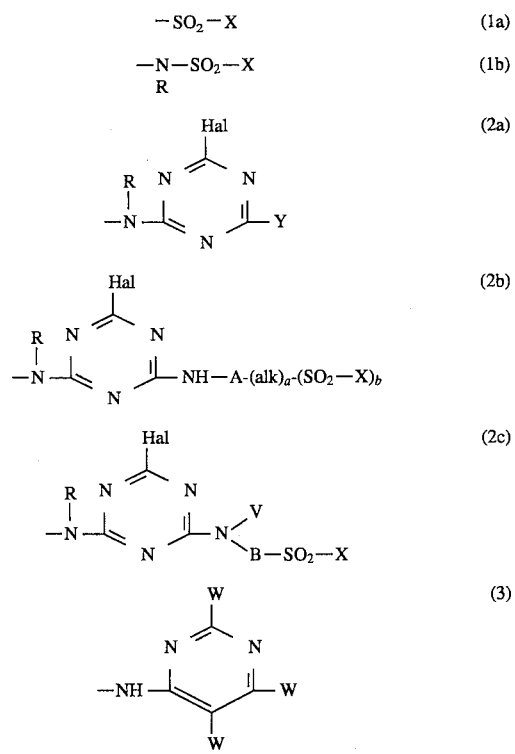

where

X is vinyl or is ethyl which is substituted in the β-position by a substituent which is eliminable with an alkali to form a vinyl group, R is hydrogen or alkyl of from 1 to 4 carbon atoms, such as ethyl and in particular methyl, Hal is halogen, such as bromine and in particular fluorine or chlorine, Y is chlorine, sulfo, cyanamido or an amino group conforming to the formula —NR$^\alpha$R$^\beta$, where R$^\alpha$ is hydrogen or alkyl of from 1 to 6 carbon atoms, preferably 1 to 4 carbon atoms, such as ethyl and methyl, which can be substituted, for example by 1 or 2 substituents from the group consisting of hydroxyl, sulfato, phosphato, sulfo, carboxyl, acetyloxy, cyano and phenyl, and R$^\beta$ is hydrogen, alkyl of from 1 to 6 carbon atoms, preferably of from 1 to 4 carbon atoms, such as ethyl and methyl, which can be substituted, for example by 1 or 2 substituents from the group consisting of hydroxyl, sulfato, phosphato, sulfo, carboxyl, acetyloxy, cyano and phenyl, cycloalkyl of from 5 to 8 carbon atoms, such as cyclopentyl, cyclohexyl and dimethylcyclohexyl, or is mono-, di- or trisulfonylnaphthyl or phenyl which can be substituted by 1, 2 or 3 substituents from the group consisting of sulfo, carboxyl, chlorine, nitro, ethyl, methyl, methoxy and ethoxy, or —NR$^\alpha$R$^\beta$ together form a saturated heterocyclic radical containing 1 or 2 lower alkylene groups with or without a further hetero group, such as an N-, O- or S-atom or NH, such as the morpholino, piperidino or piperazino radical, A is a benzene or naphthalene ring which may each be substituted, the naphthalene ring preferably by 1 or 2 sulfo groups and the benzene ring preferably by three and in particular 1 or 2 substituents, preferably those selected from the group consisting of sulfo, carboxyl, chlorine, methyl, ethyl, methoxy and ethoxy, alk is an alkylene of from 1 to 4 carbon atoms or an alkylene of from 2 to 8 carbon atoms which is interrupted by 1 or 2 hetero groups, such as oxygen atoms and amino groups, a is zero or 1, b is 1 or 2, B is alkylene of from 1 to 4 carbon atoms, such as ethylene, or an alkylene of from 2 to 8 carbon atoms which is interrupted by 1 or 2 hetero groups, such as oxygen atoms and amino groups, V is hydrogen or alkyl of from 1 to 4 carbon atoms which can be substituted by 1 or 2 substituents from the group consisting of hydroxyl, cyano, sulfo, sulfato, carboxyl, phosphato, acetyloxy and phenyl, or is a radical of the formula —B—SO$_2$—X, where B and X are each as defined above, and W is in each instance, independently of the other, halogen, such as bromine, in particular fluorine or chlorine, or phenylsulfonyl or alkylsulfonyl of from 1 to 4 carbon atoms, at least one W being halogen.

Alkali-eliminable substituents in the β-position of ethyl X are for example alkanoyloxy groups of from 2 to 5 carbon atoms, such as acetyloxy, aroyloxy groups such as sulfobenzoyloxy or carboxybenzoyloxy, trialkylammonium groups having alkyl radicals of from 1 to 4 carbon atoms, such as trimethylammonium, chlorine, bromine, alkylsulfonyloxy groups of from 1 to 4 carbon atoms, such as methylsulfonyloxy, and in particular a phosphato, thiosulfato or sulfato group. Preferably, X is vinyl and especially β-thiosulfatoethyl, β-chloroethyl or β-sulfatoethyl.

The groups "sulfo", "carboxyl", "phosphato", "thiosulfato" and "sulfato" include not only the acid form but also the salt form thereof. Accordingly, sulfo groups are groups conforming to the formula —SO$_3$M, carboxyl groups are groups conforming to the formula —COOM, phosphato groups are groups conforming to the formula —OPO$_3$M$_2$, thiosulfato groups are groups conforming to the formula —S—SO$_3$M and sulfato groups are groups conforming to the formula —OSO$_3$M, where M is in each case hydrogen or an alkali metal, such as sodium, potassium or lithium.

Anionic azo dyes which can be prepared in the form of their concentrated aqueous dye solutions by the process of the present invention are for example those which conform to the formulae (4a) and (4b)

D–N=N–K                                  (4a)

D–N=N–E–N=N–K             (4b)

where

D is a radical of the formula (5a) or (5b)

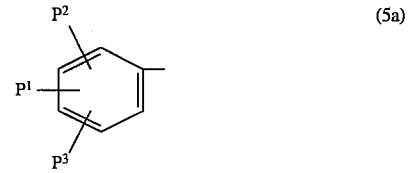

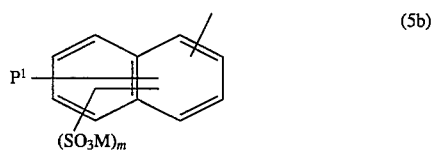

where

P$^1$ is hydrogen, sulfo or a fiber-reactive group, for example a group of the abovementioned formula (1a), (1b), (2a), (2b), (2c) or (3), which fiber-reactive grouping P$^1$ may also be bonded to the benzene or naphthalene nucleus via a bridge member, for example an alkylene radical of from 1 to 4 carbon atoms, P$^2$ is hydrogen, methyl, ethyl, methoxy, ethoxy, alkanoyl of from 2 to 5 carbon atoms, such as acetyl and propionyl, cyano, carboxyl, sulfo, alkoxycarbonyl of from 2 to 5 carbon atoms, carbamoyl, N-(C$_1$-C$_4$-alkyl) carbamoyl, fluorine, chlorine, bromine or trifluoromethyl, P$^3$ is hydrogen, methyl, ethyl, methoxy, ethoxy, cyano, carboxyl, sulfo, alkanoylamino of from 2 to 5 carbon atoms, such as acetylamino, alkoxycarbonyl of from 2 to 5 carbon atoms, carbamoyl, N-(C$_1$-C$_4$-alkyl) carbamoyl, fluorine, chlorine, nitro, sulfamoyl, N-(C$_1$-C$_4$-alkyl)sulfamoyl, alkylsulfonyl of from 1 to 4 carbon atoms, phenylsulfonyl or phenoxy or is a fiber-reactive grouping of the formula —(CH$_2$)$_c$—SO$_2$—X, where c is a number from zero to 4 and X is as defined above, although P must not be this fiber-reactive grouping if P$^1$ is a fiber-reactive grouping other than the grouping of the formula —(CH$_2$)$_c$—SO$_2$—X where c and X are each as defined above, and the benzene or naphthalene nucleus may also contain a hydroxyl group ortho to the NH$_2$ group, m is zero, 1 or 2 (if zero, this group being a hydrogen atom) and M is hydrogen or an alkali metal, such as sodium, potassium or lithium;

E is a radical of the formula (6a), (6b) or (6c)

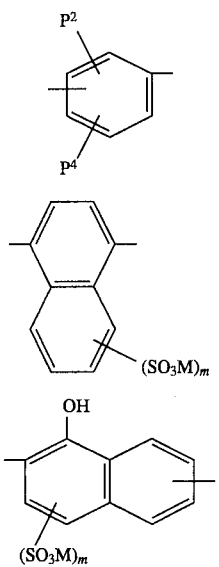

(6a)

(6b)

(6c)

where
P² and M and also m are each as defined above,
P⁴ is hydrogen, alkyl of from 1 to 4 carbon atoms, such as methyl or ethyl, alkoxy of from 1 to 4 carbon atoms, such as methoxy and ethoxy, chlorine, alkanoylamino of from 2 to 5 carbon atoms, such as acetylamino and propionylamino, benzoylamino, ureido, phenylureido, alkylureido having from 1 to 4 carbon atoms in the alkyl radical, phenylsulfonyl or alkylsulfonyl of from 1 to 4 carbon atoms;
K is a radical of the formula (7a), (7b), (7c), (7d), (7e), (7f), (7g), (7h), (7i), (7k), (7m), (7n), (7p), (7q), (7r), (7s) or (7t)

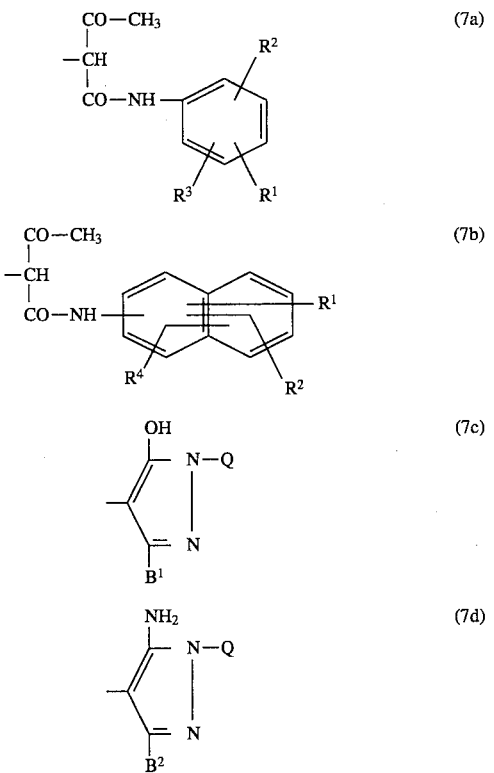

(7a)

(7b)

(7c)

(7d)

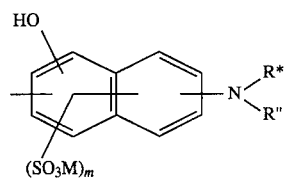

(7e)

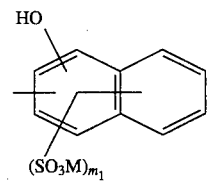

(7f)

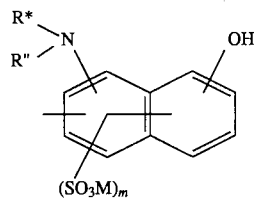

(7g)

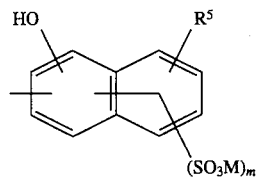

(7h)

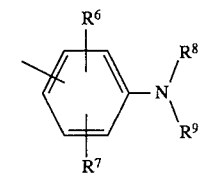

(7i)

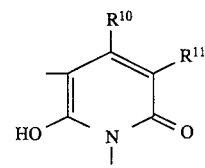

(7k)

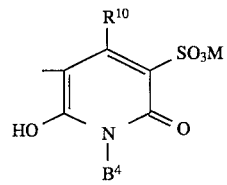

(7m)

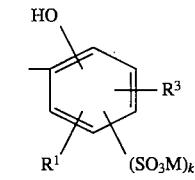

(7n)

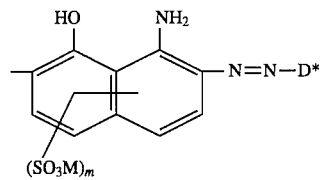

(7p)

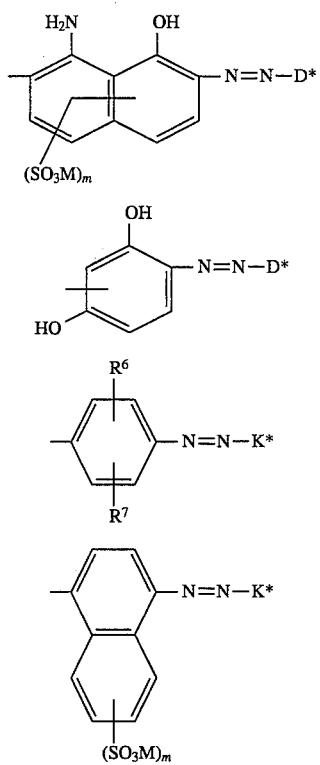

(7q)

(7r)

(7s)

(7t)

where (SO3M)=

R¹ is hydrogen, carboxyl, sulfo or a fiber-reactive group, for example a group of the abovementioned formula (1a), (1b), (2a), (2b), (2c) or (3), which fiber-reactive group may also be bonded to the benzene or naphthalene ring via an alkylene radical of from 1 to 4 carbon atoms as bridge member;

R² is hydrogen, alkyl of from 1 to 4 carbon atoms, such as methyl and ethyl, alkoxy of from 1 to 4 carbon atoms, such as methoxy and ethoxy, chlorine, bromine, carboxyl, sulfo or nitro or is a fiber-reactive grouping of the formula —(CH₂)$_c$—SO₂—X where c and X are each as defined above, although R² must not be this fiber-reactive grouping if R is a fiber-reactive grouping other than a group of the formula —(CH₂)$_c$—SO₂—X;

R³ is hydrogen, alkyl of from 1 to 4 carbon atoms, such as methyl and ethyl, alkoxy of from 1 to 4 carbon atoms, such as methoxy and ethoxy, chlorine or bromine;

R⁴ is hydrogen or sulfo;

B¹ is alkyl of from 1 to 4 carbon atoms, such as methyl, carboxyl, carbalkoxy of from 2 to 5 carbon atoms, such as carbomethoxy and carbethoxy, carbamoyl, phenyl or sulfo-, carboxyl-, methyl-, ethyl-, methoxy-, ethoxy- and/or chlorine-substituted phenyl;

B² is alkyl of from 1 to 4 carbon atoms, such as methyl, carboxyl, carbalkoxy of from 2 to 5 carbon atoms, such as carbomethoxy and carbethoxy, carbamoyl, phenyl or phenyl which is substituted by 1 or 2 substituents from the group consisting of alkyl of from 1 to 4 carbon atoms, alkoxy of from 1 to 4 carbon atoms, chlorine, bromine and sulfo;

Q is phenyl which can be substituted, for example by 1, 2 or 3, preferably 1 or 2, substituents selected from the group consisting of chlorine, bromine, methyl, ethyl, methoxy, ethoxy, carboxyl, sulfo and alkanoylamino of from 2 to 5 carbon atoms, such as acetylamino, and/or by a fiber-reactive group, for example by a group of the abovementioned formulae (1), (2) and (3), or is naphthyl, which may be substituted by 1, 2 or 3 sulfo groups and optionally by 1 alkyl of from 1 to 4 carbon atoms, 1 alkoxy of from 1 to 4 carbon atoms, 1 chlorine or 1 alkanoylamino of from 2 to 5 carbon atoms and/or by a fiber-reactive group for example, a group of the abovementioned formulae (1), (2) and (3);

R* is hydrogen or alkyl of from 1 to 4 carbon atoms which may be substituted by phenyl or by phenyl which is substituted by sulfo and/or —SO₂—X where X is as defined above;

R" is hydrogen or alkyl of from 1 to 4 carbon atoms which may be substituted by phenyl, sulfophenyl or a group of the formula —SO₂—X where X is as defined above, or is phenyl or phenyl which is substituted by 1 or 2 substituents from the group consisting of alkyl of from 1 to 4 carbon atoms, alkoxy of from 1 to 4 carbon atoms, chlorine, bromine, sulfo and —SO₂—X where X is as defined above;

R⁵ is phenylureido whose phenyl radical may be substituted by a group of the formula —SO₂—X where X is as defined above, or is alkanoylamino of from 2 to 5 carbon atoms, such as acetylamino or propionylamino, which may be substituted in the alkyl radical by a group of formula —SO₂—X where X is as defined above, or is alkenoylamino of from 3 to 5 carbon atoms, such as acryloylamino, or is benzoylamino, which may be substituted by substituents from the group consisting of chlorine, methyl, methoxy, nitro, sulfo, carboxyl and —SO₂—X where X is as defined above, or is preferably acetylamino or benzoylamino;

R⁶ is hydrogen, alkyl of from 1 to 4 carbon atoms, alkoxy of from 1 to 4 carbon atoms, sulfo, carboxyl, carbalkoxy of from 2 to 5 carbon atoms, such as carbomethoxy and carbethoxy, halogen, such as bromine or chlorine, or alkoxy of from 1 to 4 carbon atoms which is substituted by hydroxyl, acetyloxy, carboxyl, carbamoyl, cyano or halogen, such as chlorine;

R⁷ is hydrogen, alkyl of from 1 to 4 carbon atoms, alkoxy of from 1 to 4 carbon atoms, halogen, such as bromine or chlorine, cyano, trifluoromethyl, alkoxy of from 1 to 4 carbon atoms, which is substituted by hydroxyl, acetyloxy, carboxyl, carbamoyl or cyano or halogen, such as chlorine, or by a group of the formula —SO₂—X where X is defined as above, or is alkanoylamino of from 2 to 5 carbon atoms which may be substituted by chlorine, bromine, alkoxy of from 1 to 4 carbon atoms, phenoxy, phenyl, hydroxyl, carboxyl or sulfo or a group of the formula —SO₂—X where X is as defined above, or is alkenoylamino of from 3 to 5 carbon atoms which may be substituted by chlorine, bromine, carboxyl or sulfo, or is benzoylamino which may be substituted in the benzene nucleus, for example by substituents from the group consisting of chlorine, methyl, sulfo and a group of the formula —SO₂—X where X is as defined above, or is alkylsulfonyl of from 1 to 4 carbon atoms or phenylsulfonyl which may be substituted in the benzene nucleus, for example by substituents from the group consisting of chlorine, methyl, sulfo and a group of the formula —SO₂—X where X is defined above, or is alkylsulfonylamino of from 1 to 4 carbon atoms which may be substituted by hydroxyl, sulfato, chlorine, bromine, alkoxy of from 1 to 4 carbon atoms or a group of the formula —SO₂—X where X is as defined above, or is phenylsulfonylamino which may be substituted in the benzene nucleus, for example by substituents from the group consisting of chlorine, methyl, sulfo and a group of the formula —SO₂—X where X is defined as above, or is carbamoyl which may be mono- or disubstituted at the nitrogen atom by 1 or 2 substituents, the substituents belonging to the group consisting of alkyl of from 1 to 4 carbon atoms, alkyl of from 1 to 4 carbon atoms substituted by for example hydroxyl, sulfo, carboxyl, sulfato or phenyl or a group of the formula —SO₂—X where X is as defined above, cyclo-alkyl of from 5 to 8 carbon atoms, phenyl and phenyl which is substituted by substituents for example from the group consisting of chlorine, sulfo, methyl, methoxy, carboxyl and a group of the formula —SO₂—X where X is as defined above, or is sulfamoyl, which may be mono- or disubstituted at the nitrogen atom by 1 or 2 substituents, the substituents belonging to the group consisting of alkyl of from 1 to 4 carbon atoms, alkyl of from 1 to 4 carbon atoms substituted by substituents for example from the group consisting of hydroxyl, sulfo, carboxyl, sulfato and phenyl or a group of the formula —SO₂—X where X is as defined above, cycloalkyl of from 5 to 8 carbon atoms, phenyl and phenyl which is substituted by substituents for example from the group consisting of chlorine, sulfo, methyl, methoxy, carboxyl and a group of the formula —SO₂—X where X is as defined above, or is ureido or ureido which may be mono- or disubstituted at the terminal nitrogen atom by 1 or 2 substituents, the substituents belonging to the group consisting of alkyl of from 1 to 4 carbon atoms, alkyl of from 1 to 4 carbon atoms substituted by for example hydroxyl, sulfo, carboxyl, sulfato, phenyl or a group of the formula —SO₂—X where X is as defined above, cycloalkyl of from 5 to 8 carbon atoms, phenyl and phenyl which is substituted by substituents belonging for example to the group consisting of chlorine, sulfo, methyl, methoxy, carboxyl and a group of the formula —SO₂—X where X is as defined above, or $R^7$ is a fiber-reactive grouping of the halogeno-s-triazinylamino or halogenopyrimidinylamino series, for example a fiber-reactive grouping of the abovementioned formula (2a), (2b), (2c) or (3);

$R^8$ is hydrogen or alkyl of from 1 to 4 carbon atoms which may be substituted for example by hydroxyl, sulfo, carboxyl, sulfato, a group —SO₂—X where X is as defined above, phenyl or sulfophenyl, or is alkenyl of from 2 to 4 carbon atoms which may be substituted by carboxyl, sulfo, chlorine or bromine, or is cycloalkyl of from 5 to 8 carbon atoms;

$R^9$ is hydrogen or alkyl of from 1 to 4 carbon atoms which may be substituted, for example by hydroxyl, sulfo, carboxyl, sulfato, phenyl or —SO₂—X where X is as defined above, or is alkenyl of from 2 to 5 carbon atoms which may be substituted by carboxyl, sulfo or —SO₂—X where X is as defined above or by chlorine or bromine, or $R^9$ is cycloalkyl of from 5 to 8 carbon atoms or phenyl which may be substituted, for example by substituents from the group consisting of chlorine, sulfo, methyl, methoxy, carboxyl and —SO₂—X where X is as defined above, or $R^8$ and $R^9$ together with the nitrogen atom and with or without a further hetero atom or group, such as N, O, S and NH, represent a 5- to 8-membered, preferably saturated, heterocyclic radical, such as for example the N-piperidino, N-morpholino or N-piperazino radical;

$R^{10}$ is hydrogen or alkyl of from 1 to 4 carbon atoms or alkyl of from 1 to 4 carbon atoms substituted by alkoxy of from 1 to 4 carbon atoms or cyano;

$R^{11}$ is hydrogen, sulfo, sulfoalkyl having an alkylene radical of from 1 to 4 carbon atoms, such as sulfomethyl, cyano or carbamoyl;

$B^3$ is hydrogen or alkyl of from 1 to 6 carbon atoms, preferably of from 1 to 4 carbon atoms, which may be substituted by phenyl, sulfo, sulfophenyl or a fiber-reactive group, for example a fiber-reactive grouping of the abovementioned formulae (1), (2) and (3);

$B^4$ is hydrogen or alkyl of from 1 to 4 carbon atoms, which is unsubstituted or substituted by alkoxy of from 1 to 4 carbon atoms, such as methoxy, sulfo, carboxyl, sulfato, acetylamino, benzoylamino or cyano or by a fiber-reactive group, for example a fiber-reactive grouping of the abovementioned formulae (1), (2) and (3), or is alkenyl of from 2 to 4 carbon atoms, cyclohexyl or phenyl which is unsubstituted or substituted by substituents from the group consisting of carboxyl, sulfo, benzoylamino, acetylamino and chlorine and/or by a fiber-reactive group, for example a fiber-reactive grouping of the abovementioned formulae (1), (2) and (3);

k is zero or 1 (if zero, this group being a hydrogen atom);

$m^*$ is 1 or 2;

$m_1$ is 1, 2 or 3;

$D^*$ has one of the meanings specified for D, and D and $D^*$ may be identical to or different from each other;

$K^*$ is a radical of one of the above-mentioned and -defined formulae (4a) to (4m), where K and $K^*$ may be identical to or different from each other;

M has one of the abovementioned meanings.

The individual variables, including those variables which appear twice in one and the same formula, may be identical to or different from each other within their particular meaning.

The free bonds in the above formulae (7e), (7f), (7g), (7h), (7i) and (7n) which lead to the azo group and the azo group in the formulae (7p) and (7q) are ortho relative to the hydroxyl or amino group. Preferably, this hydroxyl group is bonded to the naphthalene radical in the α-position.

Alkyl groups of from 1 to 4 carbon atoms are preferably ethyl and in particular methyl; alkoxy groups of from 1 to 4 carbon atoms are preferably ethoxy and in particular methoxy; alkanoylamino groups of from 2 to 5 carbon atoms are preferably propionylamino and in particular acetylamino; and carbalkoxy groups of from 2 to 5 carbon atoms are preferably carbomethoxy and carbethoxy.

Fiber-reactive groupings having a fiber-reactive radical of vinyl sulfone or vinylsulfonamide series are for example β-choroethylsulfonyl, β-acetoxyethylsulfonyl, β-(3-sulfobenzoyloxy)ethylsulfonyl, β-sulfatoethylsulfonyl, β-thiosulfatoethylsulfonyl, β-phosphato-ethylsulfonyl, N-methyl-N-(β-sulfatoethylsulfonyl)amido, N-methyl-vinylsulfonylamido, γ-vinylsulfonylpropionylamido, β-(β'-chloroethylsulfonyl)ethylamino, γ-(β'-chloroethylsulfonyl)propionylamido, δ-vinylsulfonylbutyrylamido, δ-(β'-chloroethylsulfonyl)butyrylamido, β-(β'-vinylsulfonylethoxy)ethylamino and 4-(β-sulfatoethylsulfonyl)phenylamino.

The examples which follow serve to illustrate the invention. Parts and percentages are by weight, unless otherwise stated. Parts by weight bear the same relation to parts by volume as the kilogram to the liter.

EXAMPLE 1

421.5 parts of 4-(β-sulfatoethylsulfonyl)aniline are suspended in a solution of 10 parts of the sodium salt of a naphthalenesulfonic acid-formaldehyde condensation product having a degree of sulfonation of from about 90 to 120% and an average molecular weight of from about 6,500 and of 7 parts of a sodium polyacrylate having an average molecular weight of about 15,000 in 400 parts of water, and the suspension is then brought to about pH 5 with about 92 parts of sodium carbonate. 600 parts of ice and 400 parts of aqueous 30% strength hydrochloric acid are added, and the aniline compound is diazotized in a conventional manner by means of 280 parts of 38% strength aqueous sodium nitrite solution. 239.4 parts of 1-amino-8-naphthol-3,6-disulfonic acid are then introduced into the resulting diazoni salt suspension, and the batch is subsequently stirred at pH 1.3, maintained by means of sodium bicarbonate, and at about 15° C. for several hours.

After the first coupling reaction has ended, the batch is brought to pH 5 with about 80 parts of sodium carbonate. It is subsequently stirred for a short time until the second coupling reaction has ended, and the resulting dye solution is then clarified by stirring with diatomaceous earth and filtration.

Throughout the diazotization reaction and the two coupling reactions the reaction batch remains easily stirrable.

The filtrate is an aqueous dye solution which contains the dye of the formula

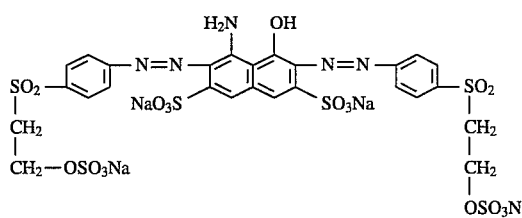

in a proportion of about 28%. It is storable for several weeks over a wide temperature range, for example from about −5°−+50° C., and applied to cellulose-containing materials by application and fixing methods customary for fiber-reactive dyes produces navy to black shades.

COMPARATIVE EXAMPLE A

To prepare the disazo dye shown by formula in Example 1, the procedure of Example 1 is repeated, except that the synthesis is carried out without the specified auxiliary mixture, with the consequence that the reaction has to be discontinued about 3 to 4 hours after the addition of the 1-amino-8-naphthol-3,6-disulfonic acid, since the reaction batch has become so viscous that the mixing of the batch required for the progress of the coupling reaction is no longer possible.

COMPARATIVE EXAMPLE B

The procedure of Comparative Example A is repeated, except that in the course of the first coupling reaction water is added to the batch in order to achieve a stirrability as in the dye synthesis of Example 1. This requires diluting the batch in the course of the first coupling reaction with a total of from 700 to 800 parts of water.

As for the rest, the two coupling reactions are carried out in accordance with the directions of Example 1. The result obtained is a dye solution which contains the disazo dye specified in Example 1 in a proportion of only 21.5%.

EXAMPLES 2 to 10

To prepare the disazo dye shown by formula in Example 1, the directions of Example 1 are followed, except that the auxiliary mixture used therein is replaced by one of the auxiliaries or auxiliary mixtures specified below in the table examples. An aqueous solution of this disazo dye is obtained in substantially the same dye concentration and with good stirrability of the reaction batch throughout the diazotization and coupling reactions.

| Example | Auxiliary (mixture) |
|---|---|
| 2 | 10 parts of a maleic acid-acrylic acid copolymer having an average molecular weight of about 70,000 |
| 3 | 14 parts of a polyacrylate having an average molecular weight of about 15,000 |
| 4 | 9 parts of a ligninsulfonate and 5 parts of a polyacrylate having an average molecular weight of about 15,000 |
| 5 | 8 parts of a methylnaphthalenesulfonic acid-formaldehyde condensation product having a degree of sulfonation of from 80 to 120% and an average molecular weight of from about 3,000 and 5 parts of a polyacrylate having an average molecular weight of about 15,000 |
| 6 | 8 parts of a ligninsulfonate and 7 parts of a naphthalenesulfonic acid-formaldehyde condensation product having a degree of sulfonation between 80 and 120% and an average molecular weight of about 6,500 |
| 7 | 23 parts of a maleic acid-acrylic acid copolymer having an average molecular weight of about 50,000 |
| 8 | 12 parts of a naphthalenesulfonic acid-formaldehyde condensation product having a degree of sulfonation of from 80 to 120% and an average molecular weight of about 6,500 |
| 9 | 20 parts of a maleic acid-methyl vinyl ether copolymer having an average molecular weight of 70,000 |
| 10 | 8 parts of a maleic acid-methyl vinyl ether copolymer having an average molecular weight of 70,000 and 5 parts of a naphthalenesulfonic formaldehyde condensation product having a degree of sulfonation of from 80 to 100% and an average molecular weight of about 5,500 |

EXAMPLE 11

287 parts of 4-(β-sulfatoethylsulfonyl)aniline are suspended in a solution of 5 parts of the sodium salt of a polyacrylic acid having an average molecular weight of 15,000 and of 10 parts of the sodium salt of a naphthalene-sulfonic acid-formaldehyde condensation product having a degree of sulfonation of from 80 to 120% and an average molecular weight of about 6,500 in 500 parts of water. A pH of about 5.5 is set by adding 60 parts of sodium carbonate; 600 parts of ice and 279 parts of 30% strength aqueous hydrochloric acid are then added, and the aniline compound is diazotized in a conventional manner by means of 182 parts of 38% strength aqueous sodium nitrite solution. 319 parts of 1-amino-8-naphthol-3,6-disulfonic acid are added to the diazonium salt suspension obtained, and the coupling reaction is carried out at pH 1.3 and at a temperature of 15° C. for several hours. Throughout the entire reaction time of the diazotization and coupling reaction the batch remains readily stirrable.

A highly concentrated dye solution/suspension is obtained of the monoazo dye of the formula

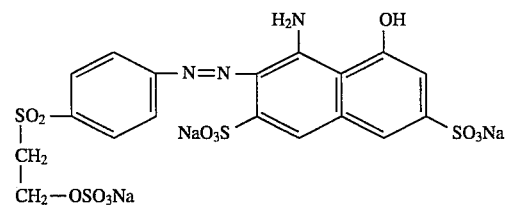

having a total dye content of about 30%, which, if necessary after dilution with water, is suitable for preparing the customary dyebaths, padding liquors and print pastes.

EXAMPLES 12 to 20

To prepare a disazo dye of the formula (A)

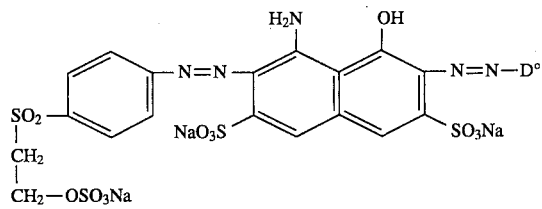

where D° has one of the meanings indicated below in the table examples and where M is an alkali metal, such as sodium, first the procedure of Example 11 is followed and then the resulting solution or suspension of the monoazo dye is admixed with the aqueous solution or suspension of a conventionally prepared diazonium salt of an aromatic amine of the formula D°—$NH_2$ where D° is as defined below in the particular table example, the reaction batch is adjusted to a pH between 4 and 6, and the second coupling reaction is carried out with this second diazo component within this pH range and at a temperature between 12° and 20° C. Customary clarification leaves a highly concentrated solution/suspension of this disazo dye. As in the reaction phase of the first coupling reaction of Example 11, the batch also remains readily stirrable throughout the second coupling reaction.

| Example | Radical D° |
|---|---|
| 12 | ![structure] 4-($MO_3S$)phenyl-NH-(triazine-Cl)-NH-3-($SO_3M$)phenyl |
| 13 | ![structure] 4-($MO_3S$)phenyl-NH-(pyrimidine with F, Cl, F) |
| 14 | ![structure] 4-($MO_3S$)phenyl-NH-(triazine-F)-NH-3-Cl-phenyl |
| 15 | phenyl-CO—NH—$(CH_2)_3$—$SO_2$—CH=$CH_2$ |
| 16 | phenyl-CO—N($CH_2$—$CH_2$—$SO_2$—$CH_2$—$CH_2$—Cl$)_2$ |
| 17 | 3-($SO_3M$)phenyl-NH-(triazine-Cl)-NH-$CH_2$—$CH_2$—OH |
| 18 | 2-Methoxy-5-(β-sulfatoethylsulfonyl)phenyl |

| Example | Radical D° |
|---|---|
| 19 | 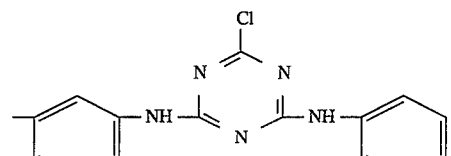 |
| 20 |  |

EXAMPLE 21

A solution of 12 parts of the sodium salt of a naphthalenesulfonic acid-formaldehyde condensation product having a degree of sulfonation of from 80 to 120% and an average molecular weight of about 6,500 in 250 parts of water is admixed with 287 parts of 4-(β-sulfato-ethylsulfonyl)aniline and is adjusted to a pH of about 5.5 with about 60 parts of sodium carbonate. Then 400 parts of ice and 279 parts of 30% strength aqueous hydro-chloric acid are added, and the aniline compound is diazotized in a conventional manner by means of 182 parts of an approximately 38% strength aqueous sodium nitrite solution. The diazonium salt suspension thus obtained is admixed with 115.6 parts of 1-amino-8-naphthol-3,6-di-sulfonic acid, and the coupling reaction is carried out at pH 1.3 and at a temperature of about 10° C. The coupling reaction ends after about 5 hours. Throughout the entire reaction time the reaction mixture remained readily stirrable.

To synthesize a second monoazo dye with the excess diazonium salt still present, the concentrated solution of the monoazo dye thus prepared is admixed with 263 parts of an aqueous suspension of 75.9 parts of 3-acetylamino-8-naphthol-6-sulfonic acid obtained by acetylation of an aqueous suspension of the sodium salt of 3-amino-8-naphthol-6-sulfonic acid with acetic anhydride. A pH of 3 is then set by the gradual addition of sodium bicarbonate, and the batch is subsequently stirred at pH 3 and at about 10°–14° C. for a further hour. To complete the coupling reaction, a pH of 4 to 5 is then set with sodium bicarbonate. Throughout these coupling reactions too the reaction batch remained readily stirrable.

After the coupling reaction has ended, the solution is clarified in a conventional manner. About 1,930 parts are obtained of an aqueous solution of a dye mixture of the two below-specified dyes of the formulae (I) and (II) in a ratio of (I):(II) of about 2:1 parts. The total dye content of the solution is about 27%.

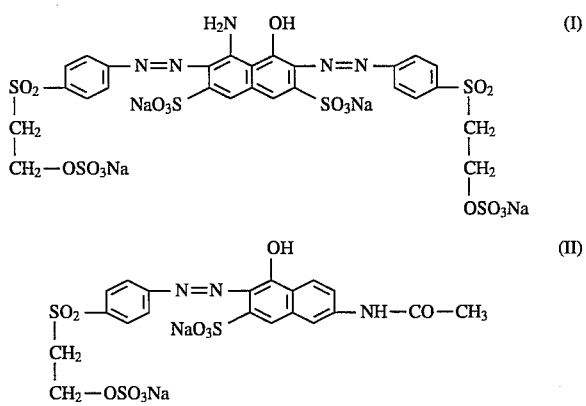

The concentrated aqueous solution of a dye mixture thus obtained can be used in a conventional manner directly for preparing aqueous dyeing liquors, dyebaths or print pastes or be converted in a conventional manner by the addition of appropriate auxiliaries, such as buffer substances, into commercial liquid preparations or by spray drying into dye powders or granules.

EXAMPLE 22

An aqueous solution of 5 parts of the sodium salt of a naphthalenesulfonic acid-formaldehyde condensation product having a degree of sulfonation of from 80 to 120% and an average molecular weight of about 900 in 500 parts of water is admixed with 341 parts of 2,5-dimethoxy-4-(β-sulfatoethylsulfonyl)aniline and adjusted to a pH of about 5.5 by means of 62 parts of sodium carbonate. 400 parts of ice and 275 parts of approximately 30% strength aqueous hydrochloric acid are then added, and the aniline compound is diazotized in a conventional manner at a temperature of from 10°–12° C. by means of 180 parts of approximately 38% strength aqueous sodium nitrite solution. The resulting diazonium salt solution is admixed with the aqueous solution/suspension, prepared in Example 11 of the monoazo dye indicated therein by formula. The coupling reaction to obtain the disazo dye is carried out after the pH has been adjusted to 5 to 5.5. Throughout both the diazotization reaction and the coupling reaction the batch remains readily stirrable. The coupling reaction is complete after about 2 to 4 hours.

Customary clarification leaves about 4,100 parts of a dye solution containing 25.6% of the dye of the formula

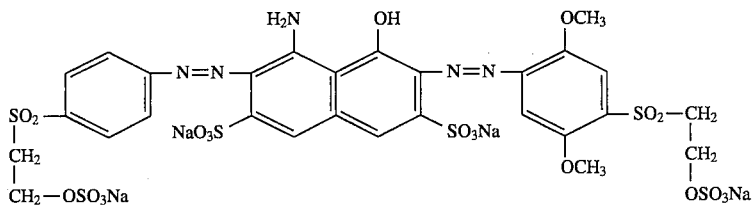

which can be used in a conventional manner for preparing dyeing liquors, dyebaths or padding liquors or for conversion into a commercial liquid preparation or into dye powder or granules.

EXAMPLE 23

421.5 parts of 4-(β-sulfatoethylsulfonyl)aniline are suspended in a solution of 10 parts of the sodium salt of a naphthalenesulfonic acid-formaldehyde condensation product having a degree of sulfonation of from 80 to 120% and an average molecular weight of about 6,500 and 2 parts of the sodium salt of a polyacrylic acid having an average molecular weight of about 15,000 in 575 parts of water, and the suspension is finally adjusted to a pH of about 5 with 91 parts of sodium carbonate. 375 parts of ice and 398 parts of approximately 30% strength aqueous hydro-chloric acid are then added, and the aniline compound is diazotized in a conventional manner with 288 parts of approximately 38% strength aqueous sodium nitrite solution at about 10°–15° C. The diazonium salt suspension thus obtained is admixed with 252 parts of 1-amino-8-naphthol-4,6-disulfonic acid, and the first coupling reaction is completed at pH 1.3 and at a temperature of 15° C. over several hours. Then a pH of 5 is set with about 75 parts of sodium carbonate, and the second coupling reaction to give the disazo dye is carried out at pH 5 and at a temperature of 15°–20° C. in the course of about an hour. Neither the diazotization reaction nor the two coupling reactions give rise to any viscous phases within the reaction batch; on the contrary, the batch remained readily stirrable through-out the entire period.

The dye solution obtained is clarified in a conventional manner. The filtrate obtained comprises about 2,530 parts of an aqueous solution containing from 29 to 30% of the dye of the formula

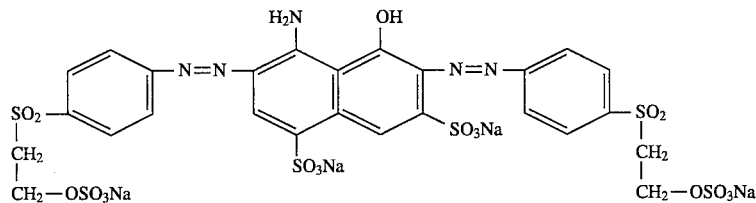

COMPARATIVE EXAMPLE C

To prepare a concentrated dye solution, the directions of Example 23 are followed, except that the auxiliary mixture specified in Example 23 is not added. On addition of the 1-amino-8-naphthol-4,6-disulfonic acid the coupling batch very quickly turns viscous and loses its stirrability. To make the dye synthesis as readily stirrable as that of Example 23, a total of 2,000 parts of water have to be added to the reaction batch. As a result, the dye solution obtained has a dye content of only about 17.5%.

EXAMPLE 24

A solution of 2 parts of the sodium salt of a naphthalenesulfonic acid-formaldehyde condensation product having a degree of sulfonation of from 80 to 120% and an average molecular weight of about 6,500 in 58 parts of water is admixed with 72 parts of 4-(β-sulfato-ethylsulfonyl)aniline, and the mixture is adjusted to a pH of from 5.5 to 6 with 17 parts of sodium carbonate. Then 87 parts of ice and 67 parts of 31% strength aqueous hydrochloric acid are added, and the diazotization reaction is carried out in a conventional manner by means of 46 parts of 38% strength aqueous sodium nitrite solution. The diazonium salt suspension thus obtained is admixed with 465 parts of an aqueous neutral suspension of 106.5 parts of 1-benzoylamino-8-naphthol-3,6-disulfonic acid, and adjusted to pH 1.3 with sodium bicarbonate, and the coupling reaction is completed at that pH and at a temperature of about 15° C. in the course of three hours. The reaction batch remains readily stirrable not only during the diazotization reaction but also during the coupling reaction. A highly concentrated solution/suspension of the monoazo dye of the formula

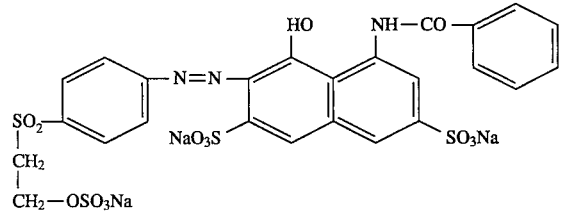

is obtained with a dye content of about 22%.

EXAMPLE 25

A solution of 20 parts of the sodium salt of a naphthalenesulfonic acid-formaldehyde condensation product having a degree of sulfonation of from 80 to 120% and an average molecular weight of about 6,500 in 600 parts of water is admixed with 287 parts of 4-(β-sulfato-ethylsulfonyl)aniline and adjusted to pH 5.5 with sodium carbonate. Then 700 parts of ice and 279 parts of 30% strength aqueous hydrochloric acid are added, and the diazotization of the aniline compound is carried out in a conventional manner with 182 parts of approximately 38% strength aqueous sodium nitrite solution. The diazonium salt suspension thus obtained is admixed with 319 parts of 1-amino-8-naphthol-4,6-disulfonic acid, and the coupling reaction is carried out at pH 1.3 and at a temperature of 10°–15° C. The coupling reaction is complete after about 5 to 8 hours. The reaction batch remained readily stirrable not only during the diazotization reaction but also during the coupling reaction.

A concentrated aqueous dye solution/suspension of the monoazo dye of the formula

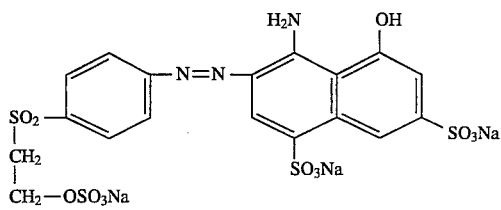

is obtained with a dye content of about 28%.

EXAMPLES 26 to 34

To prepare a disazo dye of the formula (B)

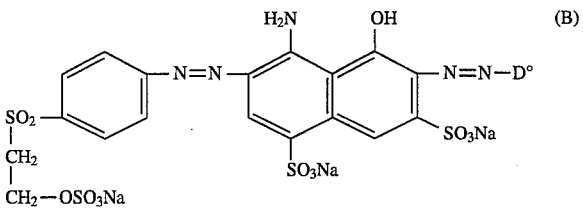

where D° is as defined below in the table examples and where M is an alkali metal, such as sodium, first the procedure of Example 25 is followed and then the resulting solution or suspension of the monoazo dye is admixed with the aqueous solution or suspension of a conventionally obtained diazonium salt of an aromatic amine of the formula D°—$NH_2$, D° being as defined in the particular table example, the reaction batch is adjusted to a pH between 4 and 6, and the second coupling reaction is carried out with this second diazo component within this pH range and at a temperature between 15° and 20° C. Conventional clarification leaves a highly concentrated solution/suspension of this disazo dye. As in the reaction phase of the first coupling reaction, the batch remained readily stirrable throughout the second coupling reaction as well.

| Example | Radical D° |
|---|---|
| 26 | ![structure with triazine bearing Cl, linking two phenyl-SO3M groups via NH] |
| 27 | ![structure with triazine bearing F, and vinyl-F/Cl substituent, phenyl-SO3M via NH] |
| 28 | ![structure with triazine bearing F, linking phenyl-SO3M and phenyl-Cl via NH] |
| 29 | —C6H4—CO—NH—$(CH_2)_3$—$SO_2$—CH=$CH_2$ |
| 30 | —C6H4—CO—N($CH_2$—$CH_2$—$SO_2$—$CH_2$—$CH_2$—Cl)$_2$ |

-continued

| Example | Radical D° |
|---|---|
| 31 | (structure: phenyl with SO₃M and NH group connected to triazine ring with Cl, and NH-CH₂-CH₂-OH) |
| 32 | 2-Methoxy-5-(β-sulfatoethylsulfonyl)phenyl |
| 33 | (structure: MO₃S-phenyl-NH-triazine(Cl)-NH-phenyl-SO₂-CH₂-CH₂-OSO₃M) |
| 34 | (structure: SO₃M-phenyl-NH-triazine(Cl)-NH-CH₂-CH₂-O-CH₂-CH₂-SO₂-CH=CH₂) |

EXAMPLE 35

21.5 parts of 4-(β-sulfatoethylsulfonyl)aniline are added to a solution of 10 parts of the sodium salt of a naphthalenesulfonic acid-formaldehyde condensation product having a degree of sulfonation of about 90 to 120% and an average molecular weight of about 6,500 in 600 parts of water and 210 parts of aqueous 30% strength hydrochloric acid, and the suspension is subsequently stirred for several hours. Then 600 parts of ice are added, and a diazotization reaction is carried out in a conventional manner with 280 parts of aqueous 38% strength sodium nitrite solution. The diazonium salt suspension obtained is then admixed with 239.4 parts of 1-amino-8-naphthol-3,6-disulfonic acid, the batch is subsequently stirred at about 15° C. and at pH 1.3, maintained by means of sodium bicarbonate, for several hours until the first coupling reaction has ended. Then the batch is adjusted to pH 5 with sodium carbonate and subsequently stirred for a short time until the second coupling reaction has ended, and the dye solution obtained is clarified by stirring with diatomaceous earth and filtration.

Throughout the diazotization reaction and the two coupling reactions the reaction batch remains easily stirrable.

The filtrate contains the disazo dye of the formula specified in Example 1 in a proportion of about 30%. The dye solution is storable for several weeks over a wide temperature range, for example from about at least −5°−+50° C., and applied to cellulose-containing materials by application and fixing methods customary for fiber-reactive dyes produces navy to black shades.

What is claimed is:

1. A process for preparing a concentrated aqueous dye solution of an anionic, water soluble azo dye, said solution having a dye content of from 15 to 40% by weight, by diazotization of an aromatic amine, containing a group of the formula —SO₂—X in which X is vinyl, or is ethyl which is substituted in the β-position by a substituent which is eliminated with an alkali to form the vinyl group, or coupling of a diazonium salt of said aromatic amine with a coupling component containing a water-soluble group, or both, in an aqueous medium, which comprises the steps of:

carrying out the diazotization of the aromatic amine, or the coupling reaction between the diazonium salt with the coupling component, or both, at a total concentration of diazonium and coupling compound of at least 15% by weight based on the aqueous medium, and conducting the reaction in the presence of an auxiliary in an amount of from 0.01 to 10 by weight, based on the weight of the azo dye to be prepared, which auxiliary exerts a viscosity reducing effect on pasty phases and is a lignosulfonate, polycarboxylate, copolymer derived from unsaturated sulfonic acids with acrylic acid, condensation product of a phenol with formaldehyde and alkali sulfite, condensation product derived from naphthalene sulfonic acids or monoalkyl and dialkyl naphthalene sulfonic acids with formaldehyde having a degree of sulfonation of 80 to 200% and a mean molecular weight of 350 to 35,000, a co-condensation product derived from an aromatic sulfonic acid with formaldehyde, or sulfosuccinic acid derivative of ethoxylated nonyl phenol formaldehyde condensation product.

2. The process of claim 1, wherein the auxiliary is a naphthalene sulfonic acid-, monoalkyl naphthalene sulfonic acid-, or dialkyl naphthalene sulfonic acid-formaldehyde condensation product having a degree of sulfonation between 80 and 150%, and an average molecular weight of between 350 and 35,000.

3. The process of claim 1, wherein the auxiliary is a lignosulfonate, a polyacrylate, a copolymer of maleic acid anhydride and methyl vinyl ether or methacrylic acid, maleic acid or acrylic acid, or a copolymer of unsaturated sulfonic acids with acrylic acid.

4. The process of claim 1, wherein the auxiliary is used in the synthesis in an amount of from 0.05 to 5% by weight, based on the weight of the azo dye to be prepared.

5. The process as claimed in claim 1, wherein the diazo component is 4-(β-sulfatoethylsulfonyl)-aniline and the coupling component is 1-amino-3,6- or -4,6-disulfo-8-naphthol.

6. A process for preparing a concentrated aqueous dye solution of an anionic azo dye, said solution having a dye content of from 15 to 40% by weight, by diazotization of an aromatic amine, or coupling of a diazonium salt with a coupling component, or both, in an aqueous medium, which comprises the steps of:

carrying out the diazotization of the aromatic amine, or the coupling reaction between the diazonium salt with the coupling component, or both, at a total concentration of diazonium and coupling compound of at least 15% by weight based on the aqueous medium, and conducting the reaction in the presence of an auxiliary having a viscosity reducing effect on pasty phases and which is a condensation product of a phenolic compound with formaldehyde and an alkali sulfite.

7. A process for preparing a concentrated aqueous dye solution of an anionic azo dye, said solution having a dye content of from 15 to 40% by weight, by diazotization of an aromatic amine, coupling of a diazonium salt and a coupling component, or both, in an aqueous medium, which comprises the steps of:

carrying out the diazotization of the aromatic amine, the coupling reaction between the diazonium salt and the coupling component, or both, at a total concentration of diazonium and coupling compound of at least 15% by weight based on the aqueous medium, and conducting the reaction in the presence of an auxiliary having a viscosity reducing effect on pasty phases and which is a sulfosuccinic semi-ester of ethoxylated nonylphenol-formaldehyde condensation products.

8. A method of reducing the viscosity of a diazotization reaction, or a coupling reaction between an aromatic amine diazo component with a coupling component, or both, during the production of a concentrated aqueous solution of an anionic azo dye, which comprises the step of:

carrying out the diazotization of the aromatic amine diazo component, the coupling reaction between the diazonium salt and the coupling component, or both in the presence of an auxiliary which exerts a viscosity-reducing effect on pasty phases, wherein the auxiliary is a lignosulfonate, polycarboxylate, copolymer derived from unsaturated sulfonic acids with acrylic acid, condensation product of a phenol with formaldehyde and alkali sulfite, condensation product derived from naphthalene sulfonic acids or monoalkyl and dialkyl naphthalene sulfonic acids with formaldehyde having a degree of sulfonation of 80 to 200% and a mean molecular weight of 350 to 35,000, co-condensation product derived from one of the above aromatic sulfonic acid with formaldehyde, sulfosuccinic acid derivatives of ethoxylated nonyl phenol formaldehyde condensation products.

* * * * *